Figure 1:
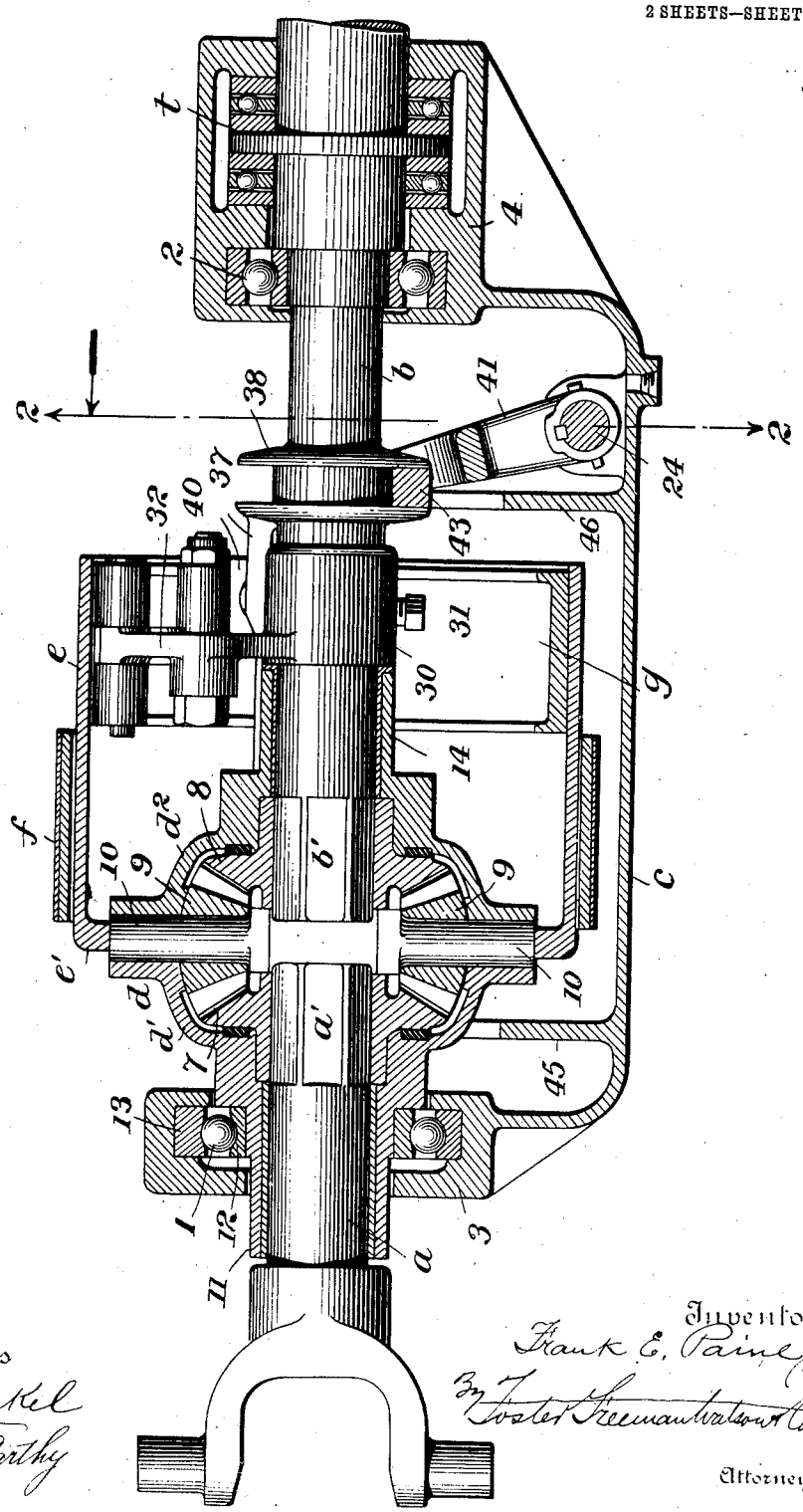

F. E. PAINE, Jr.
REVERSING GEARING.
APPLICATION FILED OCT. 1, 1907.

953,704.

Patented Apr. 5, 1910.
2 SHEETS—SHEET 1.

Witnesses

Inventor
Frank E. Paine, Jr.

Attorneys

F. E. PAINE, Jr.
REVERSING GEARING.
APPLICATION FILED OCT. 1, 1907.
953,704.
Patented Apr. 5, 1910.
2 SHEETS—SHEET 2.
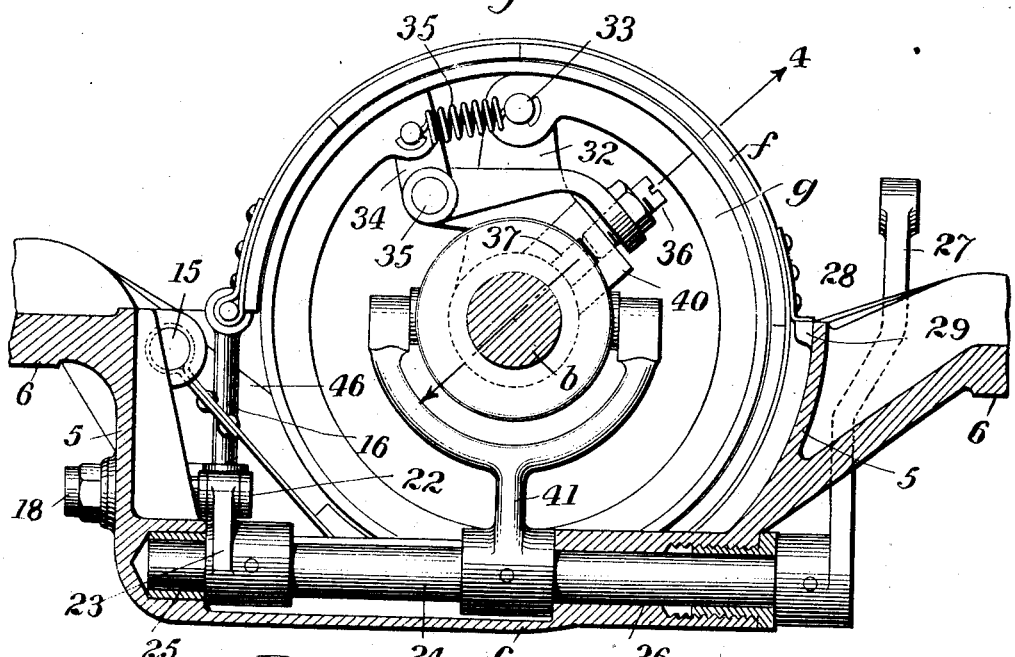
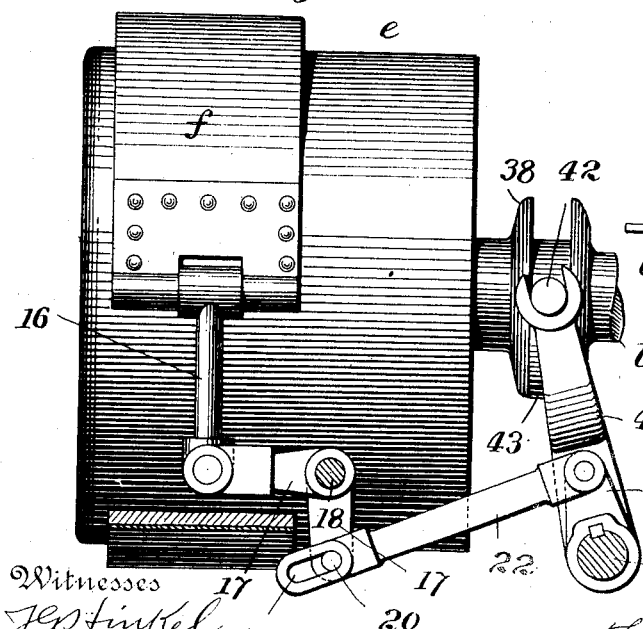
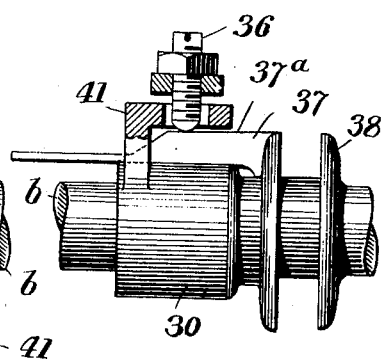
Witnesses
J. G. Hinkel
J. J. McCarthy
Inventor
Frank E. Paine Jr.
by Foster Freeman Watson & Coit
Attorneys

UNITED STATES PATENT OFFICE.

FRANK E. PAINE, JR., OF DETROIT, MICHIGAN, ASSIGNOR, BY MESNE ASSIGNMENTS, TO PACKARD MOTOR CAR COMPANY, OF DETROIT, MICHIGAN, A CORPORATION OF MICHIGAN.

REVERSING-GEARING.

953,704.

Specification of Letters Patent.  Patented Apr. 5, 1910.

Application filed October 1, 1907. Serial No. 395,386.

*To all whom it may concern:*

Be it known that I, FRANK EVERETT PAINE, Jr., citizen of the United States, residing at Detroit, county of Wayne, State of Michigan, have invented certain new and useful Improvements in Reversing-Gearing, of which the following is a specification.

This invention relates to reverse-clutch mechanism, for reversing the direction of rotation of a driven shaft without changing the direction of rotation of a driving shaft geared to it, and it consists in certain features of construction the details and advantages of which will be hereinafter pointed out.

In the accompanying drawings, Figure 1 is a vertical section through the mechanism, taken on the line of the shafts; Fig. 2 is a section on the line 2—2 of Fig. 1; Fig. 3 is a side elevation of the clutch pulley, brake-band and operating levers, looking from left to right, in Fig. 2, and Fig. 4 is a detail view of the wedge and adjacent parts for operating the clutch ring, taken on the line 4 of Fig. 2.

In the drawing $a$ indicates a driving shaft member which is constantly driven in one direction by a suitable motor, such as an internal combustion engine, and $b$ indicates the driven shaft member which it is desired to operate in either direction at will, such as the propeller shaft of a boat. The shaft members, as shown, are arranged in line with one another and supported by ball bearings 1 and 2 which are arranged within pillow blocks 3 and 4 at the ends of a frame or bed $c$ which extends beneath the shafts. The frame $c$ is dish-shaped, and its sides 5 are provided with laterally projecting arms 6 by which it may be suspended from suitable beams or supports in a boat. In addition to the radial ball-bearing 2, a thrust ball bearing $t$ is arranged in the pillow block 4 of the frame, for taking up the endwise pressure or thrust of the driven shaft member $b$.

A pair of bevel gears, 7 and 8, are mounted upon angular portions $a'$ and $b'$ of the shafts $c$, $b$, respectively, and rotate therewith, and between these gears and meshing therewith are arranged one or more intermediate bevel gears or pinions 9, which are journaled upon studs 10, the latter being arranged radial to the shaft members and supported in a casing $d$ which incloses the gears and is journaled upon both of the shaft members. The gear casing is made in two parts $d'$ and $d^2$, between which the studs 10 are secured. The part $d'$ has a long sleeve bearing 11 which extends through the pillow-block 3 and the shaft member $a$ is journaled in this sleeve, so that said member may turn within the sleeve when the gear casing is held stationary by the means hereinafter described. Ordinarily the casing turns with the shaft member $a$, as hereinafter explained, and, therefore, the ball bearing 1 is arranged between the sleeve and the pillow-block 3, a ball race-way 12 being secured on said sleeve opposite a race-way 13 in said block. The part $d^2$ of the gear casing is substantially the same as the part $d'$, its sleeve bearing 14, however, being somewhat shorter than the sleeve of the member $d'$, and no external bearing being required or provided.

A clutch drum or pulley $e$ is secured rigidly to the gear casing $d$ by means of an internal flange $e'$ on the pulley which is clamped between the two parts of said casing. This drum is concentric with the shaft member $b$. Upon the outer side of the drum is arranged a brake-band $f$ and upon the inner side a split ring clutch member $g$. Means are provided for moving the brake band out of engagement with the drum and then moving the clutch member into engagement with the drum so that the drum and gear casing will be locked to the shaft member $b$, and for releasing the clutch and then moving the brake-band into engagement with the drum, so that the drum and gear casing will be held stationary. As shown in the drawing, one end of the brake-band $f$ is secured to a stud 15 at one side of the frame and the other end of the band is secured to a rod 16 which is connected to a bell-crank lever 17, the latter being suitably mounted upon a stud 18 which is secured to one side of the frame. One arm of the bell-crank lever has a pin 20 which projects into a slot 21 in a link 22 which is pivotally connected to an arm 23 upon a rock shaft 24, which latter is suitably journaled in bearings 25 and 26 in the lower part of the frame adjacent to one end thereof. The movement of the rock shaft in one direction will, through the connections described, draw the brake-band against the pulley, and a movement of the rock shaft in the opposite direction will release the band, as will be obvious. In order to support the upper half of the band out of engagement with the pulley, when the band is released, a stop 28 is arranged upon the band and adapted to engage a stop 29 upon the frame. These stops support the band at one side of the pulley and the stud 16 supports the band at the opposite side of the pulley when the band is released.

A collar 30 is secured to the driven shaft member $b$ by suitable means, such as a set screw 31, and this collar has an arm 32 upon which one end of the clutch ring $g$ is secured by a pivot pin 33. The opposite end of the clutch ring is pivotally connected to one arm of a bell crank lever 34, and the two ends of the clutch ring are connected by a spring 35. The bell crank lever 34 is mounted upon a pivot pin 35 which is supported by the arm 32 and the free end of said bell crank lever is provided with an adjusting screw 36 which bears upon the cam or wedge 37. The cam 37 is integrally connected with a groove collar 38 which rotates with the driven shaft but is movable lengthwise on said shaft. The collar 30 has a guideway 40 for the wedge 37 and the wedge serves as a key for the collar 38. The collar 38 is moved lengthwise on the shaft by means of a forked arm 41 which is secured to the rock shaft 24 and engages trunnions 42 upon a semi-circular yoke 43 which fits within the groove in the collar 38. When the shaft 24 is rocked so as to bring the high surface 37ª of the wedge under the adjusting screw 36, the bell crank 34 will be rocked so as to expand the clutch ring $g$ and engage the latter with the clutch pulley. This movement of the rock shaft will also cause the link 22 to move the bell crank 17 so as to release the brake band $f$. A reverse movement of the rock shaft will release the clutch member and set the brake-band, as will be evident. The pin-and-slot connection between the link 22 and bell crank lever 17 permits the high part of the wedge to move out from under the adjusting pin 36, and thus release the clutch before the brake moves into engagement with the pulley, when the rock shaft is turned in one direction, and when the rock shaft is turned in the opposite direction the band is released before the wedge forces the clutch ring into engagement with the pulley.

In order to prevent oil and grease from the bearings at the ends of the frame from coming in contact with the clutch pulley, the frame is provided with integral partitions 45 and 46 extending transversely thereof between the clutch pulley and the bearings. The rock shaft 24 is arranged between the partition 46 and one end of the frame, and its bearings 25 and 26, being in the lower part of the frame, are amply lubricated by the drip from the bearings in the pillow block 4.

As the driving shaft member $a$ always rotates in one direction, and the gear casing is locked to the driven member the greater part of the time, the ball bearings 1 are provided between the gear casing and the pillow block 3. Normally therefore the two shaft members rotate in ball bearings. As the driven member is, in practice, only reversed occasionally for short periods of time, in order to back the boat or vehicle, it is not important to provide ball bearings between the gear casing and the shaft members. When the clutch is released and the brake applied, it will be evident that the gear casing will then be held stationary and the shafts will rotate in opposite directions in the sleeve bearings of the casing. It will be noted that by extending the sleeve on the gear casing through the pillow block, a long and substantial bearing is provided for the driving shaft member.

What I claim is,

1. In a reversing driving mechanism, the combination with a dish-shaped bed or frame having a transverse partition therein and having bearings at its ends on opposite sides of said partition, of driving and driven shafts respectively supported in said bearings, reversing coupling mechanism mounted on said shafts between the partition and one end of said frame, and a rock shaft arranged to operate said coupling mechanism, said rock shaft being mounted in the lower part of the frame on the opposite side of the partition from said coupling mechanism.

2. In a reversing driving mechanism, the combination with a dish-shaped supporting bed or frame having bearings in its ends and two transverse partitions intermediate said bearings, the compartments between the partitions and the bearings being adapted to receive the oil from the bearings, of driving and driven shafts supported in said bearings, coupling mechanism connecting said shafts and including a friction drum located between said partitions, and means for operating said coupling mechanism.

3. In a reversing driving mechanism, the combination with a dish-shaped supporting bed or frame having bearings at its ends, and having transverse partitions between the bearings dividing said frame into a central and two end compartments, of driving and driven shafts supported in said bearings, coupling mechanism adapted to connect said shafts and located in said central compartment, a rock shaft journaled in the lower part of said frame in one of the end compartments, whereby the rock shaft may receive lubricating oil from one of the end bearings, and an arm on said rock shaft for operating said coupling mechanism, said coupling mechanism being protected from oil by said partitions.

In testimony whereof I affix my signature in presence of two witnesses.

FRANK E. PAINE, JR.

Witnesses:
 MILTON TIBBETS,
 CLARA DALE.